(12) United States Patent
Roth et al.

(10) Patent No.: US 6,204,369 B1
(45) Date of Patent: Mar. 20, 2001

(54) PROCESS FOR THE PREPARATION OF ALYKL POLYGLYCOSIDES

(75) Inventors: C. Deane Roth; Frank L. Edwards, both of Decatur, IL (US); Patrick McCurry, Jr., West Chester, OH (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/327,932

(22) Filed: Jun. 8, 1999

(51) Int. Cl.$^7$ .............................. C01H 15/04; C11D 3/38
(52) U.S. Cl. ...................... 536/18.6; 510/470; 536/4.1
(58) Field of Search .................................. 536/18.6, 4.1, 536/124; 510/470

(56) References Cited

U.S. PATENT DOCUMENTS

| | | | |
|---|---|---|---|
| 3,839,319 | 10/1974 | Mansfield | 260/210 R |
| 4,721,780 | 1/1988 | McDaniel, Jr. et al. | 536/18.6 |
| 4,939,245 | 7/1990 | Rasche et al. | 536/18.6 |
| 4,950,743 | 8/1990 | McCurry, Jr. et al. | 536/18.6 |
| 4,987,225 * | 1/1991 | Pickens et al. | 536/124 |
| 5,003,057 | 3/1991 | McCurry, Jr. et al. | 536/186 |
| 5,304,639 | 4/1994 | Gibson | 536/18.6 |
| 5,362,861 | 11/1994 | McCurry, Jr. et al. | 536/4.1 |
| 5,374,716 * | 12/1994 | Biermann et al. | 536/18.6 |
| 5,457,190 | 10/1995 | Gibson et al. | 536/18.6 |
| 5,480,978 | 1/1996 | Johannisbauer et al. | 536/4.1 |
| 5,554,742 * | 9/1996 | Wolf et al. | 536/18.6 |
| 5,756,072 * | 5/1998 | Beck et al. | 424/49 |

FOREIGN PATENT DOCUMENTS

| | | |
|---|---|---|
| 197 33 269 A1 | 4/1999 | (DE) . |
| 0 569 682 A1 | 3/1993 | (EP) . |
| WO 96/03412 A1 | 2/1996 | (WO) . |
| WO 98/17379 A1 | 4/1998 | (WO) . |

* cited by examiner

*Primary Examiner*—Howard C. Lee
(74) *Attorney, Agent, or Firm*—John E. Drach; Joanne Mary Fobare Rossi; Aaron R. Ettelman

(57) ABSTRACT

A process for preparing alkyl polysaccharides comprising introducing a mixture of a hydrous saccharide in a first portion of fatty alcohol, introducing a second portion of fatty alcohol, agitating the mixture, allowing it to crystallize, reducing water content, contacting the reduced water content dispersion containing solid particles with an effective amount of acid catalyst and reacting the aliphatic alcohol with the saccharide source to form an alkylpolyglycoside.

32 Claims, No Drawings

PROCESS FOR THE PREPARATION OF ALYKL POLYGLYCOSIDES

BACKGROUND OF THE INVENTION

Alkyl polyglycosides have been known for at least sixty years. They are nonionic surfactants with low toxicity and gentleness to the skin. They can be made from renewable resources and are rapidly degraded in the environment.

Early processes for the preparation of alkyl polyglycosides were two-step processes. The first step comprised the reaction of a lower alcohol having 1 to 6 carbon atoms with a source of saccharide in the presence of an acid catalyst to form the alkyl polyglycoside. These alkyl polyglycosides do not have useful surfactant properties. Since water is miscible with, or highly soluble in, the alcohols, the reaction mixture can contain substantial quantities of water (see U.S. Pat. No. 4,721,780). The higher alkyl polyglycosides in which the aliphatic group contains from 7 to 22 carbon atoms, were prepared by transacetalization of the lower glycosides with higher fatty alcohols under substantially anhydrous conditions.

More recently, alkyl polyglycosides having alkyl groups with from 7 to about 22 carbon atoms have been prepared by a "direct process". In the "direct process" a long chain fatty alcohol is reacted with a source of saccharide in the presence of an acid catalyst under conditions in which the water formed in the reaction is removed as quickly as it is formed to maintain the water content of the reaction mixture at as low a level as is reasonably possible. The water formed in the reaction is only slightly soluble in the fatty alcohol and any undissolved water results in the rapid formation of unwanted byproducts. The parameters of the "direct process" were set out in U.S. Pat. No. 3,839,318, which is incorporated herein by reference. Other patents such as U.S. Pat. Nos. 4,939,245, 4,950,743 and 5,003,057 also describe the "direct process" and are incorporated herin by reference.

In the direct process an anhydrous source of saccharide or a hydrous saccharide source mixed with an alcohol, present in stoichiometric excess, is heated under reduced pressure to remove the water. An acid catalyst is added to the mixture of saccharide source and fatty alcohol and after the water has been substantially eliminated, the mixture is heated under reduced pressure to form the alkyl polyglycoside. As an alternative, a slurry of anhydrous saccharide and alcohol can be formed. The slurry is then added to a heated second portion of alcohol. It is preferred to use a hydrous saccharide source since hydrous saccharide sources are much less expensive than the anhydrous material.

Sources such as 70% high dextrose syrup being liquids, are easier to handle, easier to pump and significantly less expensive then the anhydrous sources presently being used, but have not been used because of the inherent problems caused by the water present. Water in the reaction is only slightly soluble in the fatty alcohol and any undissolved water results in the rapid formation of unwanted byproducts. Also high dextrose syrup is less pure then other forms of dextrose presently being used. It is therefore desirable to find a method of producing alkyl polyglycoside which can use a hydrated saccharide, such as high dextrose syrup, as a source of dextrose as a raw material in the process.

SUMMARY OF THE INVENTION

One aspect of the invention pertains to a process for preparing a substantially dry mixture of a saccharide in a solvent such as an alcohol. The first step of the process comprises mixing a dextrose syrup with an amount of a $C_{7-22}$ fatty alcohol sufficient to thoroughly wet the saccharide. In the next step a second portion of a second $C_{7-22}$ fatty alcohol is added to the mixture to form a dispersion. The third step involves allowing the dispersion to stand for a period of time sufficient to form solid particles. The dispersion forms as a semi solid mass which is broken into smaller particles. The next step comprises reducing the water content of the dispersion subsequent to the solid particles being formed by reducing the pressure to from about 100 to about 1 mm Hg and a temperature wherein the lower temperature limit is selected such that the solvent is maintained in a liquid phase.

Another aspect of the invention pertains to a process for producing alkyl polyglycosides which utilizes the substantially dry saccharide-solvent mixture described above. This process is comprised of all of the above steps plus reacting the $C_{7-22}$ fatty alcohol with the saccharide in the presence of an effective amount of an acid catalyst at a temperature of from about 80° C. to about 140° C. under a reduced pressure to form a reaction mixture containing the alkyl polyglycoside.

The present invention permits the manufacture of an alkyl polyglycoside using a relatively inexpensive liquid, high dextrose carbohydrate syrup as a raw material and the simultaneous process advantages of using an anhydrous dextrose. The anhydrous dextrose is formed with minimal energy requirements compared to known dehydration methods.

DETAILED DESCRIPTION OF THE INVENTION

The term "fatty alcohol" as used herein refers to aliphatic alcohols having from about 7 to about 22 carbon atoms. The alcohol may also be an alkoxylated alcohol represented by the formula:

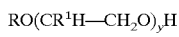

$$RO(CR^1H-CH_2O)_yH$$

wherein R is the residue of a fatty alcohol containing form about 7 to 22 carbon atoms, R1 is H, CH3, or —CH2–CH3 and Y is a number form 0 to 5. The alcohols can be saturated or unsaturated, natural or synthetic, straight chain or branched chain. The fatty alcohol used in the process of the invention can be a single alcohol or a mixture of alcohols. Preferably, the fatty alcohols are aliphatic alcohols having from 8 to about 18 carbon atoms. Alcohols having aromatic or other cyclic moieties in their structure can also be reacted but the glycosides formed are generally not as biodegradable as the glycosides formed from aliphatic alcohols.

All pressures expressed in mm Hg are absolute pressures unless otherwise noted.

The term extinction coefficient as used herein refers to the calculated absorbance of a theoretical solution containing one gram of solid material per cubic centimeter of solution measured and calculated according to the formula:

$$E470=A/(C*L)$$

Wherein:
A=measured absorbence at 470 nm
C=concentration in grams per cm3
L=path length in centimeters and
E(479)=extinction coefficient at 470 nm As used herein, a "hydrous saccharide source" refers to a reducing sugar or an oligomer or polymer comprising moieties of a reducing sugar which under the acid conditions of the process forms a reducing saccharide required to react with the alcohol. Examples of some saccharides that can be used are any 6 carbon or 5 carbon sugars such as dextrose, mannose, xylose or arabinose. The term "hydrous" refers to a solid or liquid saccharide source which contains water. Materials such as dextrose monohydrate, solidified high dextrose corn syrup, liquid high dextrose corn syrup and the like have been found useful to prepare the alkyl polyglycosides by the improved process of the invention.

The term "alkyl polyglycoside" is used to denote a composition of the formula:

$$RO(CR^1H\text{---}CH_2O)_yG_x$$

wherein R is the residue of a fatty alcohol having from about 7 to about 22 carbon atoms; $R^1$ is H, $CH_3$ or $CH_2CH_3$, G is the residue of a reducing saccharide; y is an average number of from 0 to about 5; and x is an average number of from 1 to about 5. Preferably x is a number of from 1 to about 2.5.

G is the residue of a reducing saccharide. The residue of a reducing saccharide can be the residue of a monosaccharide such as glucose, fructose, lactose, mannose, xylose and the like or the residue or fragments of a polysaccharide or oligosaccharide such as isomaltose, maltose, cellobiose, mellobiose, maltotriose and the like. The oligosaccharides can undergo transglycosidation under the acid conditions and elevated temperature of the process to produce the reducing saccharide moieties which react with the alcohol and/or a hydroxyl of a mono or polyglycoside.

The source of saccharides useful in the practice of the present invention are hydrous materials; that is, they contain water. The water may be in the form of water of crystallization or merely water which has been adsorbed on the surface of the saccharide source or the source of saccharide may be in a liquid syrup form. Materials such as dextrose monohydrate which contain one molecule of water for each saccharide unit and solidified high dextrose corn syrup are useful in the practice of the invention.

The process consists of two processing steps involving a hydrous saccharide source, particularly high dextrose corn syrup (HDCS) in preparing it for an alkyl polyglycoside synthesis.

Step 1: A heated (all-liquid) hydrous saccharide such as HDCS (70–71% dissolved solids) is combined with a solvent, preferably a long chain fatty alcohol, allowed to cool and solidify as small particles in the solvent.

Step 2: The solidified saccharide is dehydrated at low pressure and low temperature, ultimately, to the anhydrous solid state, where upon, a catalyst is added (optionally, more fatty alcohol can be added) as needed for the alkyl polyglycoside surfactant synthesis to be carried to completion.

By the term solidify it is meant that the particles formed in the mixture are a combination of crystalline and amorphous particles.

It has surprisingly been found that when mixing the high dextrose syrup with the alcohol as provided by the invention, agitating the mixture and then allowing it to stand, that two dispersing phases are formed and that the dextrose solidifies into a semi rigid mass of small amorphous or crystalline solid particles that is easily broken up. Without limiting the scope of the invention by the mechanism by which the crystallization happens, it is theorized that the combination of the syrup and alcohol allows the dextrose to be slowly dehydrated allowing for the small particle formation.

It has also surprisingly been found that when using the solidification process of the invention that the beta-form of the dextrose molecule is the preferential form to solidify. When analyzed it was been found that 60 to 95% of the dextrose is in the beta form. It is well known in the art that the beta-form dissolves faster then the alpha form. The rate of reaction is controlled by the rate of dissolution and since the beta form is faster to dissolve than the alpha form, the beta form has a higher rate of reaction. This makes a mixture enriched in the beta form of dextrose, a preferential form for the raw material used in the reaction to form alkyl polyglycoside.

The process according to the invention comprises the steps of:

a) mixing a hydrous saccharide with a suitable first portion of a suitable solvent to form a mixture;

b) combining a suitable second portion of a second suitable solvent, wherein the second solvent is an alcohol, with the mixture of step a) to form a dispersion;

c) allowing the dispersion to stand for a suitable period of time sufficient to form solid particles (crystal slurry);

d) reducing the size of the solid particles;

e) reducing the water content of the dispersion subsequent to the solid particles being formed (dehydrated crystal slurry);

f) contacting the reduced water content dispersion containing solid particles with an effective amount of acid catalyst; and g) reacting the solvent of step b) with the saccharide at a temperature of from about 80° C. to about 140° C. under a reduced pressure to form a reaction mixture containing the alkyl glycoside.

As used herein, a "suitable first portion" of solvent refers to the quantity of solvent with which the hydrated saccharide source is combined. The first portion of the solvent (i.e., fatty alcohol) generally is less than half of the total amount of solvent present during crystallization/solidification and subsequent dehydration (steps a–e) of the hydrous saccharide. Generally, the first portion of the solvent comprises from about 5% to about 45% and more preferably about 10% to about 20% of the amount of solvent present in the crystal slurry. Alcohol can be added to the dehydrated crystal slurry before the addition of the catalyst (step f) if necessary in order to achieve the appropriate molar ratio of fatty alcohol to reducing saccharide for the alkyl polyglycoside reaction.

As used herein, a "suitable second portion" of solvent refers to the quantity of solvent in which the hydrated saccharide source is dispersed. The second portion of the solvent (i.e., fatty alcohol) generally is more than half of the total amount of solvent present during crystallization/solidification and subsequent dehydration (steps a–e) of the hydrous saccharide. Generally, the second portion of the solvent comprises from about 55% to about 95% and more preferably about 80% to about 90% of the amount of the total solvent present in the crystal slurry.

It is contemplated within the scope of the invention that the first suitable solvent and the second suitable solvent can be the same solvent.

A pressure of about 100 mm Hg or less, can be used to remove the water from the saccharide slurry, preferably at a pressure below about 50 mm Hg, if the solvent is an alcohol containing at least 10 carbon atoms. The pressure at which the water removal is accomplished is dependent upon the solvent used in the process and is preferably in the range at which the reaction between the alcohol and saccharide source is to be carried out. The pressure is preferably in the range of from about 1 mm Hg to about 100 mm Hg, more preferably in the range of from about 5 mm Hg to about 70 mm of Hg. The reaction between the alcohol and saccharide source is carried out in the same pressure range. The reduced pressure is useful in reducing the amount of water in the mixture to a level at which the likelihood of unwanted side reactions is low and the process is directed to formation of the alkyl polyglycoside. The lower limit of the temperature is selected such that the solvent remains liquid. Preferably, for solvents such as midcut alcohols (i.e., $C_8$ to $C_{12}$–$C_{14}$ alcohols) and lower carbon number alcohols, the temperature is maintained below 30 degrees C. for the initial water removal and then can be increased in the later stages to from about 80 degrees C. to about 140 degrees C. For longer chain alcohols the lowest temperature must be above the freezing point of the alcohol mixture at the working pressure.

A mixture of saccharide source and fatty alcohol containing an amount of water which approaches the equilibrium moisture content under the conditions of temperature and pressure is considered as substantially anhydrous. The preferred compositions generally contain less than 1% by weight water, preferably less than 0.5% by weight water. The amount of water present in the mixture depends upon the alcohol present and the temperature and pressure under which the mixture is maintained.

During the alcohol-saccharide reaction (steps f and g), the fatty alcohol present in the reacting mixture ranges from more than 1 mole of fatty alcohol per mole of the reducing saccharide residue to a practical limit of about 15 moles of fatty alcohol per mole of reducing saccharide residue. Preferably, the amount of fatty alcohol in the reacting mixture ranges from about 1.5 moles to about 8 moles and most preferably from about 2 to about 7 moles and more preferably from about 2.5 to about 5 moles of fatty alcohol per mole of reducing saccharide residue. The fatty alcohol is always present in stoichiometric excess during the reaction.

The ratio of fatty alcohol to reducing saccharide residue during the alkyl polyglycoside reaction is generally maintained at a point at which the reacting mixture has sufficient fluidity so that it can be adequately heated, pumped and stirred to keep the undissolved source of saccharide in suspension and to permit the water formed in the reaction to be rapidly removed from the reacting mixture. Preferably from about 2 moles of fatty alcohol per mole of saccharide residue to about 6 moles of fatty alcohol per mole of saccharide residue are sufficient to maintain the reacting mixture in a fluid state.

The ratio of moles of fatty alcohol to moles of reacted reducing saccharide residue in the reacting mixture also impacts the degree of polymerization (DP) or the value of x in the alkyl polyglycoside product.

The mixture is heated to a temperature in the range of the reaction temperatures. The reaction between a fatty alcohol and a source of reducing saccharide is generally carried out in the range of from about 80° C. to about 140° C., and preferably in the range of from about 95° C. to about 125° C. and most preferably from about 100° C. to about 120° C. The reduced pressure which can be maintained on a $C_7$ alcohol is higher than one which can be maintained when a $C_{22}$ fatty alcohol is utilized as the reactant. The pressure must be as low as possible without boiling a substantial amount of the fatty alcohol from the reaction mixture. The mixture of the anhydrous saccharide in the fatty alcohol produced by the crystallization and subsequent dehydration of the hydrous saccharide source is heated until the alkylpolyglycoside reaction temperature range is attained. Preferably, the water has been reduced to a level at which undissolved water is minimal in the reaction mixture and most preferably to a level as low as is commercially practical. Water content can be further lowered by the use of an inert gas sweep over the crystallized mixture during the water removal step. Examples of inert gases that can be used for the sweep include but are not limited to nitrogen, helium, carbon dioxide and hydrogen. All of the water cannot be removed from the mixture under any reasonable conditions and therefore a small amount of water is always present in the reacting mixture.

After the amount of water in the saccharide/fatty alcohol mixture has been reduced to the required level, an acid catalyst is introduced into the mixture. The acid catalysts useful in the practice of the present invention are well known materials. Examples of inorganic acids useful as the acid catalyst in the practice of the present invention include, but are not limited to, sulfuric acid, phosphoric acid, hydrochloric acid, and the like, and mixtures thereof. Examples of organic acids useful as the acid catalyst in the practice of the present invention include, but are not limited to trifluoroacetic acid, paratoluene sulfonic acid, sulfosuccinic acid, cumene sulfonic acid, sulfonated fatty acids and sulfonated fatty acid esters, acid forms of surfactants such as mono- or di-alkyl benzene sulfonic acids, fatty alcohol sulfates, alkoxylated fatty alcohol sulfates, alkylsulfonates, alkyl esters of sulfosuccinic acid, mono- or di-alkyl naphthalene sulfonates wherein the alkyl group or groups contain more than a total of about 8 carbon atoms, and preferably in the range of 16 to about 32 carbon atoms, acid forms of resins and other known acid catalysts for the acetalization of reducing saccharides by fatty alcohols, and mixtures thereof. Mixtures of inorganic and organic acids are also useful as the acid catalyst in the practice of the present invention.

After the addition of the catalyst, the reacting mixture is well agitated and maintained at the reaction temperature in the range of from about 80° C. to about 140° C. under a reduced pressure to remove the water formed in the reaction substantially immediately as it is formed. If the mixture of fatty alcohol and saccharide source is in the required temperature range, as soon as the acid catalyst is introduced into the mixture, the fatty alcohol begins reacting with the saccharide source to form water and the alkyl polyglycoside. With aqueous solutions of polar catalysts, a temperature lower than reaction temperature is selected for catalyst addition. After catalyst addition, the temperature is raised to promote the desired reaction rate. The reaction is carried out for a sufficient length of time to react the source of saccharide present in the reaction mixture with the fatty alcohol to form the alkyl polyglycoside. As is well understood in the art, the degree of polymerization (the number of glycoside residues which are polymerized and attached to an aliphatic group) is determined by: 1. structure and the excess of the fatty alcohol; 2. the amount and type of catalyst utilized; and 3. reaction time, temperature and pressure. The effect of these variables is known in the art and will not be discussed here.

The disclosure of U.S. Pat. No. 5,457,190 is herein incorporated by reference. As is well known in the art, the acetalization of the saccharide source with the fatty alcohol produces water. The reaction between the fatty alcohol and the saccharide source under the acid conditions is carried out under sufficient agitation and reduced pressure to permit the water formed in the reaction to be rapidly separated from the reacting mixture. The water is removed from the reacting mixture substantially as soon as it is formed due to the elevated temperature and the reduced pressure maintained on the reacting mixture. It is desired to maintain the water in the reaction mixture at a low level so that no undissolved free water is present in the reacting mixture. The mixture of the saccharide source and the fatty alcohol is reacted for from about 1 to about 15 hours after the acid catalyst has been introduced into the mixture. The reaction is carried out until the amount of unreacted saccharide source in the mixture has reached a predetermined level. Generally, the amount of unreacted saccharide source in the reaction mixture is less than about 5% by weight of the alkyl polyglycoside formed and preferably less than about 2% by weight of the alkyl polyglycoside formed and most preferably less than 0.25% by weight of the alkyl polyglycoside formed.

After the reaction has been substantially completed, the reaction mixture can be cooled. After the reaction mixture has been cooled to a predetermined temperature, the reaction mixture can be transferred to the product recovery portion of the process for further treatment.

The reaction can be run as a batch or continuous process.

In an alternative method, after the reaction mixture has been reduced to the required residual saccharide content, a neutralizing material such as an alkali metal hydroxide, alkali earth metal oxide, alkali earth metal hydroxide or a mixture thereof can be added to neutralize the acid catalyst. As is well known in the art, the neutralized mixture is then passed to a means for separating the unreacted fatty alcohol to recover the alkyl polyglycoside and the alkyl polyglycoside can be mixed with water and/or further treated to reduce the color, stabilize the color and dilute the material to the concentration at which it is to be sold. Generally the alkyl polyglycosides are sold as aqueous mixtures containing from about 30% to about 80% by weight of the active surfactant material.

There are many ways that the process according to the invention can be carried out. The important parameters of the process are the formation of a slurry of a hydrous source of reducing saccharide in a first portion of fatty alcohol, introducing the slurry of the hydrous saccharide source in the first portion of the fatty alcohol into a second portion of fatty alcohol, agitating, allowing sufficient time for the saccharide to solidify, and breaking any semi solid mass formed into smaller particles. Water is removed from the fatty alcohol containing the now solidified hydrous saccharide under a reduced pressure and at a low temperature for the initial stages of water removal and then at an elevated temperature for later stages of water removal. The temperature is generally maintained at a level such that water can be removed from the mixture but the hydrous saccharide does not liquefy. After its water content has been reduced to a desired level, the mixture of fatty alcohol and saccharide is contacted with an effective amount of an acid catalyst and the temperature is raised to, or maintained in, the range for reaction between the alcohol and saccharide. The mixture is reacted at an elevated temperature and reduced pressure to form the alkyl polyglycoside.

The alkyl polyglycoside containing mixture is generally further treated to neutralize the acid catalyst, separate the excess or unreacted fatty alcohol from the alkyl polyglycoside product, mix with water, reduce the level of color of the product, stabilize the color and adjust the concentration of the alkyl polyglycoside to the concentration and pH level at which it is sold.

The acid can be neutralized with alkali metal hydroxides, alkaline earth metal oxides or hydroxides, aluminum hydroxide or oxide or mixtures thereof. The unreacted fatty alcohol can be separated from the alkyl polyglycoside product by solvent extraction, low pressure evaporation such as in a thin film evaporator, wiped film evaporator and the like, such as by the method described in U.S. Pat. Nos. 5,304,639 and 5,480,978, the contents of each of which is incorporated herein by reference. The product can be treated to reduce and stabilize the color before or after separation of the fatty alcohol from the neutralized reaction mixture, such as by the method described in U.S. Pat. Nos. 4,950,743 and 5,362,861, the contents of each of which is incorporated herein by reference. Preferably the fatty alcohol is removed from the product before the product is treated to reduce and stabilize the color. The color level can be reduced by known oxidation means such as hypochlorite bleaching, peroxide bleaching, ozone treatment, alkali metal borohydride addition and the like.

EXAMPLES

Example 1

A 5 liter, 4 neck flask was equipped with a mechanical stirrer, thermometer, nitrogen purge capillary, vapor takeoff assembly train including a cold $H_2O$ condenser, and graduated receiver. Vacuum was provided by recycle aspirator, heat by an electric mantle, as required. An addition funnel was provided for catalyst addition and a rubber septum for hypodermic sampling.

The carbohydrate was a high dextrose corn syrup (HDCS) with a nominal dextrose equivalent value of 95 and nominally 71 wt % dissolved solids. To be in an all liquid state HDCS, all of the dextrose must be melted. This temperature can be readily determined by one skilled in the art. At lower temperatures HDCS solidifies.

To the flask was added 764.8 g (3 moles) of liquefied HDCS and 200 g of a commercial grade mid-cut alcohol (C12, C13 alcohol, nominally 45% C12 and 55% C13) with average molecular weight of 193. The mixture was stirred slowly for 1 hour and cooled to 30 degrees C. An additional 1200 g of the C12–C13 alcohol was added, stirred briskly to "emulsify" (approximately 30 sec.), then allowed to stand, no stirring, overnight. A semi-solid crystal slurry formed in the flask. This was readily broken apart by stirring.

Example 2

Dehydration of Example 1

Vacuum was applied to the flask (18–20 mm Hg pressure), followed by stirring of the crystal slurry. Water was distilled off. Heat (via the mantle) was slowly applied, the temperature was maintained under 30° C. in the initial dehydration stages.

TABLE 1

Temperature and Water Removal Profiles
HDCS in C12–C13 alcohol

| Time Minutes | Temperature degrees C. | Water Removed milliliters |
|---|---|---|
| 0 |  | 0 |
| 15 | 27 | 3 |
| 30 | 27.5 | 85 |
| 45 | 28 | 20 |
| 50 | 28 | 25 |
| 60 | 28 | 34 |
| 70 | 28 | 43 |
| 80 | 28 | 51 |
| 90 | 29 | 60 |
| 100 | 29 | 68 |
| 110 | 29 | 76 |
| 120 | 30 | 84 |
| 130 | 32 | 94 |
| 140 | 33 | 105 |
| 150 | 34 | 115 |
| 160 | 36 | 125 |

TABLE 1-continued

Temperature and Water Removal Profiles
HDCS in C12–C13 alcohol

| Time Minutes | Temperature degrees C. | Water Removed milliliters |
|---|---|---|
| 170 | 38 | 133 |
| 180 | 42.5 | 141 |
| 190 | 48 | 149 |
| 200 | 54 | 153 |
| 210 | 56 | 160 |
| 220 | 64 | 166 |
| 225 | 65.5 | 173 |
| 230 | 67 | 180 |
| 235 | 68 | 186 |
| 240 | 70.1 | 193 |
| 245 | 71 | 198 |
| 250 | 74.5 | 201 |
| 255 | 79 | 202 |
| 260 | 84 | 202 |
| 265 | 89 | 203 |
| 270 | 95 | 204 |
| 275 | 102 | 204 |
| 280 | 105 | 204 |

Example 3

Crystallization With a C8–C10 Alcohol

Three moles (3 moles) of all liquid HDCS and 200 g of a commercially available C8–C10 alcohol which is nominally composed of 10% C8 and 90% C10 fatty alcohol, were combined as in example 1. The mixture was allowed to cool to 30 degrees C. (approximately 1.5 hours) and then an additional 918.5 g of the alcohol was added. The mixture was stirred briskly and then allowed to stand for 14 hours. A crystal slurry formed in the flask. This was broken apart by stirring.

Example 4

Dehydration of Example 3

The dehydration of the resulting crystal slurry from example 3 has a Temperature Profile and a Water Removal Profile comparable to Example 2 which are shown in Table 2.

TABLE 2

Temperature and Water Removal Profiles
HDCS in C12–C13 alcohol

| Time Minutes | Temperature degrees C. | Water Removed milliliters |
|---|---|---|
| 0 | | 0 |
| 30 | 24 | 0 |
| 40 | 25 | 3 |
| 50 | 25 | 6 |
| 60 | 25 | 10 |
| 70 | 25.5 | 20 |
| 80 | 25.5 | 30 |
| 90 | 25.5 | 40 |
| 100 | 25.5 | 50 |
| 110 | 25.5 | 60 |
| 120 | 28 | 68 |
| 130 | 29 | 81 |
| 140 | 30 | 91 |
| 150 | 31 | 105 |
| 160 | 32.5 | 117 |
| 170 | 34 | 126 |

TABLE 2-continued

Temperature and Water Removal Profiles
HDCS in C12–C13 alcohol

| Time Minutes | Temperature degrees C. | Water Removed milliliters |
|---|---|---|
| 180 | 36 | 138 |
| 190 | 40 | 146 |
| 200 | 43 | 152 |
| 210 | 49 | 157 |
| 220 | 55 | 161 |
| 230 | 60.5 | 163 |
| 235 | 61 | 168 |
| 240 | 62 | 172 |
| 245 | 62.5 | 175 |
| 250 | 63 | 180 |
| 255 | 64 | 183 |
| 260 | 64.5 | 187 |
| 270 | 66.5 | 194 |
| 275 | 67 | 198 |
| 280 | 68 | 202 |
| 285 | 68.5 | 205 |
| 290 | 70 | 207 |
| 300 | 75 | 208 |
| 310 | 83 | 209 |
| 320 | 91 | 210 |
| 330 | 95 | 210 |
| 340 | 100 | 210 |

Examples 5 and 6

Alkylpolyglycoside Synthesis

The crystallized dehydrated high dextrose corn syrups of Examples 2 and 4 were reacted in their respective alcohols using dinonylnaphthalene sulfonic acid as catalyst at 105 degrees C. and 30 mm Hg pressure absolute. Data on the resulting alkyl polyglycoside surfactant products are given below:

| | Carbohydrate Fatty Alcohol Combination | Additional alcohol added (grams) | Alkyl polyglycoside solids (%) | Color ($\epsilon$) extinction coefficient |
|---|---|---|---|---|
| Ex. 5 | Example 2 | 1219 | 29.4–30.0 | 2.1 |
| Ex. 6 | Example 4 | 989 | 31.2–31.8 | 0.7 |

Example 7

Four vials were filled with 7.5 g of all liquid high dextrose corn syrup (HDCS) and 14 g of LOROL® 1214A, a trademark of Henkel Corporation. LOROL® 1214A is a fatty alcohol nominally comprising 67% C12, 27% C14, 6% C16 with traces of C10 and C18 fatty alcohol. Each vial was shaken thoroughly for 30 seconds to "emulsify". Each vial was stored at a selected constant temperature overnight and the texture and appearance was then noted.

| Temp. ° C. | Description after 15 hours |
|---|---|
| 40 | Semi solid. Stirs like crystals in syrup. |
| 35 | Borderline acceptable crystallinity. Alcohol is liquid. |
| 30 | Much improved crystallinity. Alcohol is liquid. |
| 25 (ambient) | Good crystals but alcohol is solidified. |

Example 8

The procedure of example 1 was used. Three moles of HDCS was crystallized in LOROL® 1214A while trying to maintain a temperature of 25° C. to 27° C. After 9 hours the temperature decreased to 24° C. A liquid-crystal slush resulted. This was stirred and dehydrated.

What is claimed is:

1. A process for preparing an alkyl polyglycoside, said process comprising:
   (a) providing a dispersion comprising a hydrous saccharide source and an alcohol, wherein the hydrous saccharide source contains at least a saccharide and an amount of water;
   (b) allowing the dispersion to stand for an amount of time sufficient to form a slurry comprising a semi-solid mass of saccharide particles;
   (c) breaking up the semi-solid mass;
   (d) reducing the amount of water in the slurry; and
   (e) reacting the alcohol and the saccharide in the presence of a catalytically-effective amount of an acid catalyst to form an alkyl polyglycoside.

2. The process according to claim 1, wherein the hydrous saccharide source comprises dextrose monohydrate.

3. The process according to claim 1, wherein the hydrous saccharide source comprises a dextrose syrup.

4. The process according to claim 1, wherein the alcohol comprises a fatty alcohol.

5. The process according to claim 1, wherein the alcohol comprises one or more components represented by the general formula:

$$RO(CR^1H-CH_2O)_yH$$

wherein R represents a linear or branched, saturated or unsaturated hydrocarbon moiety having from about 7 to about 22 carbon atoms; $R^1$ represents a hydrogen atom, a methyl group, or an ethyl group; and y is a number of from 0 to 5.

6. The process according to claim 1, wherein the alcohol comprises an aliphatic alcohol having from about 8 to about 18 carbon atoms.

7. The process according to claim 1, wherein the alcohol comprises a mixture of mid-cut alcohols.

8. The process according to claim 1, wherein an inert gas sweep is maintained over the slurry while reducing the water content.

9. The process according to claim 1, wherein the reduction of the water content comprises a pressure reduction.

10. The process according to claim 1, wherein the alcohol and the saccharide are present in a molar ratio of from greater than 1:1 to about 15:1.

11. The process according to claim 1, wherein providing the dispersion comprises:
   (i) combining the hydrous saccharide source with a first amount of a suitable solvent sufficient to wet the saccharide; and
   (ii) combining the wetted saccharide with the alcohol.

12. The process according to claim 11, wherein the first amount of the suitable solvent is less than 50% by weight of the total amount of suitable solvent and the alcohol.

13. The process according to claim 11, wherein the first amount of the suitable solvent is from about 10% to about 20% by weight of the total amount of suitable solvent and the alcohol.

14. The process according to claim 11, wherein the suitable solvent comprises a fatty alcohol.

15. The process according to claim 11, wherein the suitable solvent comprises one or more components represented by the general formula:

$$RO(CR^1H-CH_2O)_yH$$

wherein R represents a linear or branched, saturated or unsaturated hydrocarbon moiety having from about 7 to about 22 carbon atoms; $R^1$ represents a hydrogen atom, a methyl group, or an ethyl group; and y is a number of from 0 to 5.

16. The process according to claim 11, wherein the suitable solvent comprises an aliphatic alcohol having from about 8 to about 18 carbon atoms.

17. The process according to claim 11, wherein the suitable solvent comprises a mixture of mid-cut alcohols.

18. The process according to claim 11, wherein the suitable solvent and the alcohol are identical.

19. The process according to claim 11, wherein the hydrous saccharide source comprises dextrose monohydrate.

20. The process according to claim 11, wherein the hydrous saccharide source comprises a dextrose syrup.

21. A process for preparing an alkyl polyglycoside, said process comprising:
   (a) combining a dextrose syrup which contains at least a saccharide and an amount of water with a first amount of a fatty alcohol sufficient to wet the saccharide, whereby a dextrose syrup/fatty alcohol mixture is formed;
   (b) combining the dextrose syrup/fatty alcohol mixture with a second amount of the fatty alcohol sufficient to form a dispersion, wherein the first amount of the fatty alcohol is from about 10% to about 20% by weight of the total amount of fatty alcohol;
   (c) allowing the dispersion to stand for an amount of time sufficient to form a slurry comprising a semi-solid mass of saccharide particles;
   (d) breaking up the semi-solid mass;
   (e) reducing the amount of water in the slurry, wherein an inert gas sweep is maintained over the slurry while reducing the water content; and
   (f) reacting the fatty alcohol and the saccharide in the presence of a catalytically-effective amount of an acid catalyst at a temperature of from about 80° C. to about 140° C., to form an alkyl polyglycoside;

wherein the fatty alcohol is represented by the general formula:

$$RO(CR^1H-CH_2O)_yH$$

wherein R represents a linear or branched, saturated or unsaturated hydrocarbon moiety having from about 7 to about 22 carbon atoms; $R^1$ represents a hydrogen atom, a methyl group, or an ethyl group; and y is a number of from 0 to 5; and wherein the fatty alcohol and the saccharide are present in a molar ratio of from about 2:1 to about 6:1.

22. A process for preparing a substantially dry, saccharide-containing mixture, said process comprising:
   (a) providing a dispersion comprising a hydrous saccharide source and an alcohol, wherein the hydrous saccharide source contains at least a saccharide and an amount of water;
   (b) allowing the dispersion to stand for an amount of time sufficient to form a slurry comprising a semi-solid mass of saccharide particles;
   (c) breaking up the semi-solid mass; and
   (d) reducing the amount of water in the slurry.

23. The process according to claim 22, wherein the hydrous saccharide source is selected from the group consisting of dextrose monohydrate and dextrose syrups.

24. The process according to claim 22, wherein the alcohol comprises one or more components represented by the general formula:

$$RO(CR^1H\text{—}CH_2O)_yH$$

wherein R represents a linear or branched, saturated or unsaturated hydrocarbon moiety having from about 7 to about 22 carbon atoms; $R^1$ represents a hydrogen atom, a methyl group, or an ethyl group; and y is a number of from 0 to 5.

25. The process according to claim 22, wherein the alcohol comprises a mixture of mid-cut alcohols.

26. The process according to claim 22, wherein an inert gas sweep is maintained over the slurry while reducing the water content.

27. The process according to claim 22, wherein the reduction of the water content comprises a pressure reduction.

28. The process according to claim 22, wherein providing the dispersion comprises:
  (i) combining the hydrous saccharide source with a first amount of a suitable solvent sufficient to wet the saccharide; and
  (ii) combining the wetted saccharide with the alcohol.

29. The process according to claim 28, wherein the first amount of the suitable solvent is less than 50% by weight of the total amount of suitable solvent and the alcohol.

30. The process according to claim 28, wherein the suitable solvent comprises a fatty alcohol.

31. The process according to claim 30, wherein the suitable solvent and the alcohol are identical.

32. A process for preparing a substantially dry, saccharide-containing mixture, said process comprising:
  (a) combining a dextrose syrup which contains at least a saccharide and an amount of water with a first amount of a fatty alcohol sufficient to wet the saccharide, whereby a dextrose syrup/fatty alcohol mixture is formed;
  (b) combining the dextrose syrup/fatty alcohol mixture with a second amount of the fatty alcohol sufficient to form a dispersion, wherein the first amount of the fatty alcohol is from about 10% to about 20% by weight of the total amount of fatty alcohol;
  (c) allowing the dispersion to stand for an amount of time sufficient to form a slurry comprising a semi-solid mass of saccharide particles;
  (d) breaking up the semi-solid mass; and
  (e) reducing the amount of water in the slurry, wherein an inert gas sweep is maintained over the slurry while reducing the water content;

wherein the fatty alcohol is represented by the general formula:

$$RO(CR^1H\text{—}CH_2O)_yH$$

wherein R represents a linear or branched, saturated or unsaturated hydrocarbon moiety having from about 7 to about 22 carbon atoms; $R^1$ represents a hydrogen atom, a methyl group, or an ethyl group; and y is a number of from 0 to 5.

* * * * *